July 20, 1965 J. C. SMELTZER ETAL 3,196,390

COMPUTER TESTING SYSTEM

Filed Feb. 13, 1961 2 Sheets-Sheet 1

ELLIOTT E. RECH
JACK C. SMELTZER
*INVENTORS.*

BY Samuel Lindenberg

ATTORNEY

ELLIOTT E. RECH
JACK C. SMELTZER
INVENTORS.

BY Samuel Lindenberg

ATTORNEY

United States Patent Office 3,196,390

Patented July 20, 1965

3,196,390

COMPUTER TESTING SYSTEM

Jack C. Smeltzer, Woodland Hills, and Elliott E. Rech, Canoga Park, Calif., assignors, by mesne assignments, to The Bunker-Ramo Corporation, Stamford, Conn., a corporation of Delaware Filed Feb. 13, 1961, Ser. No. 88,993

6 Claims. (Cl. 340—146.1)

This invention relates to information-handling systems and, more particularly, to a method and means for testing for the proper operation thereof.

Information-handling systems, such as digital computers, have become very useful tools, not only for assisting in the processing of the paper-work activities of modern business, but also for use in process control in manufacturing. This tool, however, is rather complex, and every effort is made to increase its reliability. Since substantially every operation of a digital computer utilizes its memory in one way or another, any decrease in reliability in, for example, the system employed for reading information stored in that memory, reflects directly on the reliability of the computer.

An object of this invention is to provide a method and means for checking the reliability of the read system of a computer.

Another object of this invention is the provision of a simple arrangement for checking the reliability of the read system from a memory.

Yet another object of this invention is the provision of an improved method and means for enabling a rapid check upon whether there is any deterioration in the system employed to read from the memory of a computer.

A popular method of recording information in a magnetic memory, such as a magnetic drum, is one wherein, in the process of determining the difference between ones and zeros which have been recorded it is necessary to apply a clock pulse to the readout circuitry in addition to the data signals. In accordance with this invention, the clock pulse is shifted in phase either forward or backward, and the time duration that the clock pulse can be shifted before the read system fails to differentiate ones and zeros can be used as an indication of the deterioration of the read circuitry.

When a moving magnetic surface is used as a storage medium in a digital computer, normally, information is recorded with a particular phase relationship to the computer clock pulses. In the explanation of the present invention, one particular method of recording will be described, called the "Manchester" method of recording. This, however, should not be construed as a limitation upon the invention, but merely examplary thereof. In the "Manchester" method of recording, the magnetic surface is magnetized in one of two opposite directions, depending upon whether a one or a zero is being recorded. Information read-back must then be compared with the computer clock, in order to differentiate ones from zeros.

Figure 1:
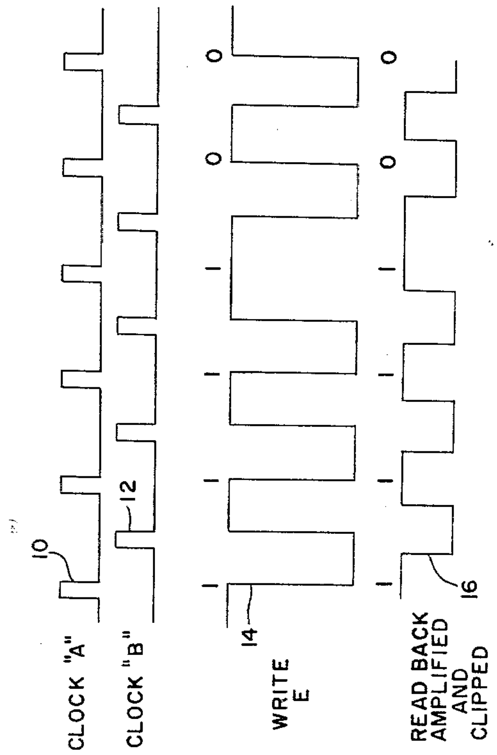

Referring now to FIGURE 1, there is shown a wave shape representation of a clock-pulse train 10, designated by Clock A, and other pulse train 12 (not in phase with Clock A), designated as Clock B. Present-day digital computers usually record pulses around the periphery of a magnetic drum which are continuously read from the drum to serve as the clock pulses for the computer. The pulses read from the drum, comprising a continuous-pulse train, are usually applied to circuitry which generates as many different clock-pulse trains as are required for operation of the computer. Here two clock-pulse trains, Clock A and Clock B, are shown by way of illustration. Normally, the phase relationships between the clock-pulse trains are made different.

The wave shape 14 represents data bits which are to be recorded, employing each one of the Clock A pulses. These data bits represents 1–1–1–1–0–0, by way of example. The wave shape 16 represents the signals derived from the magnetic recording medium after they have been amplified and clipped. Although these are shown on the same time scale as the write signal, it should be understood that this is done for the purpose of showing their position relative to a train of clock pulses, and it should not be inferred that they are read out at the identical time as the signals 14 are recorded. It should be noted, however, that the Clock A pulses and the read-back signals 16 can be compared to define a one or a zero.

Figure 2:
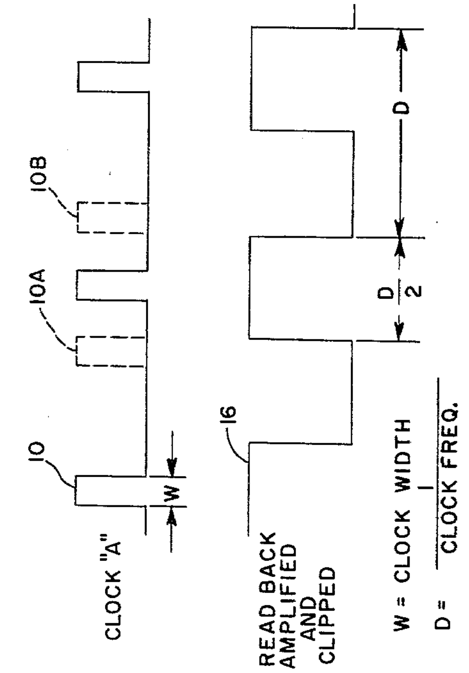
FIGURES 1 and 2 are wave shape diagrams which are shown to assist in an understanding of this invention.

An enlarged portion of the wave shape shown in FIGURE 1 is shown in FIGURE 2 in order to more clearly show how the Clock A pulses 10 and the read-back signal 16 may be compared to define a one or a zero. Normally each clock pulse A occurs during the center of the interval of a pulse read from the drum. Since the width of each clock pulse is narrower than the digit pulses representative of a one or a zero, it is possible to shift the clock pulse a distance from the center position before the read system fails to differentiate between a one and a zero. The pulses 10A, 10B, represented by dotted lines, show these shifted clock-pulse positions. If the duration or width of a digit pulse is ½D, where D is the time between successive clocks, and W represents the width of a clock pulse, then a clock pulse can theoretically be shifted $\pm(\frac{1}{4}D-\frac{1}{2}W)$ microseconds from the center position before a failure to differentiate between a one and a zero occurs.

Any of the common types of distortion that can occur in a read-write system will cause this theoretical time duration to decrease, which in turn decreases the reliability of the read system. Since every operation of a digital computer utilizes the memory in one way or another, any decrease of reliability in the read system reflects directly on the reliability of the entire computer. In accordance with this invention, the phase of the clock pulse is shifted with respect to the read information until a failure to define ones and zeros occurs. The extent of the phase shift required to achieve this is taken as a measure of the reliability and, conversely, the extent of the deterioration of the system. This time duration is referred to as a phase margin.

Figure 3:
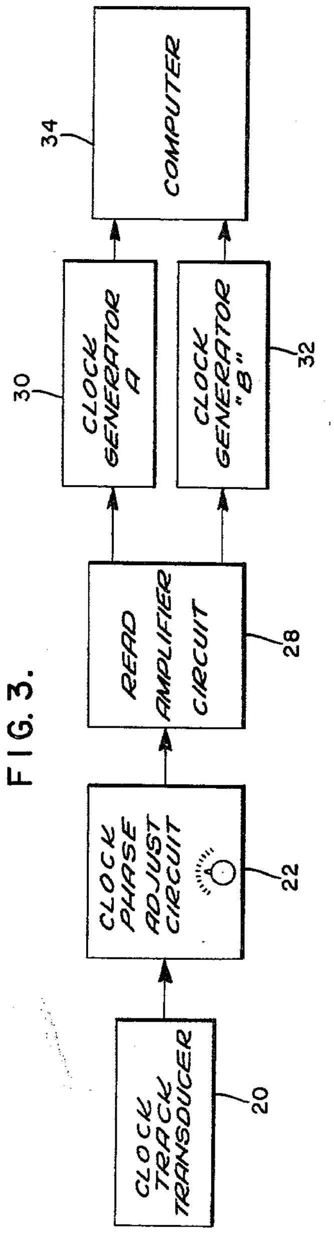
FIGURE 3 is a block diagram showing how this invention may be included in the read circuitry of a computer.

Reference is now made to FIGURE 3, which is a block diagram which in accordance with this invention shows a preferred location for a clock-phase adjust circuit 22 whereby phase-shift may be achieved. The rectangle 20, labeled "clock-track transducer," represents the magnetic-reading head which is positioned over a clock track recorded on a magnetic drum for the purpose of reading clock pulses therefrom. The output signal from the clock-track transducer is applied to apparatus 22, designated as clock-phase adjust circuit. A knob 24 is provided thereon which, in conjunction with a calibrated dial 26, can be operated to indicate the amount of phase delay, or phase advance, of the clock pulses with respect to the usual position of clock pulses. The output of the clock phase-adjust circuit is applied to the usual read-amplifier circuit, which provides as an ouput two signal trains, one of which is displaced with respect to the other. These signal trains are applied to respective clock generator A–30 and clock generator B–32, which comprise the well-known shaping and amplifying circuitry for providing narrow rectangular pulses, shown as Clock A and Clock B in FIGURE 1. The output of the clock generator A and clock generator B is applied to the balance of the computer 34 for use in the operation thereof.

Referring back to FIGURE 2, it will be seen that in accordance with this invention, apparatus must be provided for shifting a clock pulse from the position shown by the solid line to positions represented by the dotted lines 10A and 10B. The dotted lines 10A represent the position of a clock pulse which has been advanced to the point where "one" signals can no longer be detected. Similarly, the dotted lines 10B represent the position of a clock pulse which has been delayed to the point where it can no longer be employed for detecting a one digit which has been read from the memory. In an embodiment of the invention which has been built, and operated, the clock-phase adjust circuit was required to shift the clock signal 130° in order to cover the range indicated. A circuit for phase-margin checking which can properly operate in accordance with this invention must be free from transients, such as caused by switches, must not vary the amplitude of the clock signal in the process of switching, must maintain its amplitude stable despite variation in voltage used in the circuit, and must be capable of providing an accurate indication of phase advance or phase retard, as the case may be, and must maintain the phase stable with variations in voltage, component characteristics, and temperature.

Figure 4:
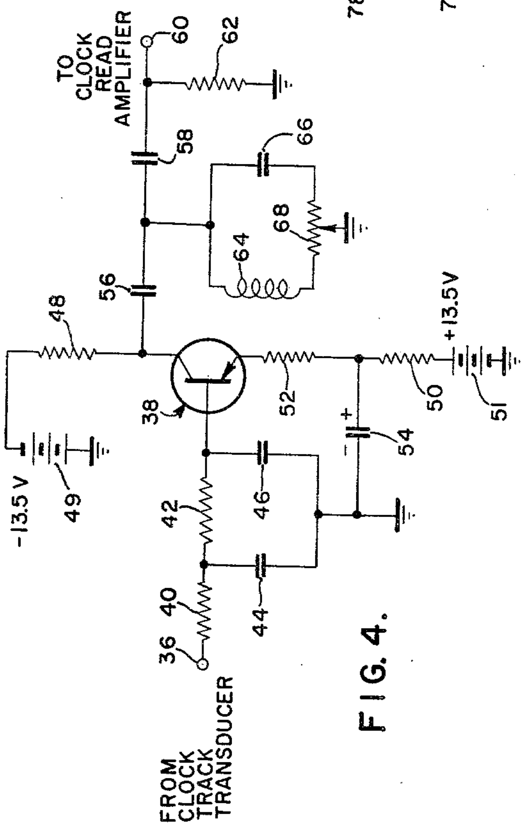
FIGURE 4 is a circuit diagram of a clock-phase adjust circuit in accordance with this invention.

FIGURE 4 is a circuit diagram of a clock-phase adjust circuit which meets these requirements. Clock signals which are read are applied to the terminals 36. This terminal is connected over a low-pass filter network to the base of the transistor 38. The filter network includes a first resistor 40, which is connected in series with the second resistor 42. The resistors 40 and 42 connect the terminal 36 to the base of transistor 38. The junction of resistors 40 and 42 is connected through a capacitor 44 to ground. The base of transistor 38 is connected through a capacitor 46 to ground. A resistor 48 connects a source of negative operating potential 49 to the collector of transistor 38. A source of positive operating potential 51 is connected through a pair of resistors 50, 52, which are connected in series to the emitter of transistor 38. The junction of the resistors 50 and 52 are connected through a capacitor 54 to ground.

A phase-shifting network is connected to the collector of the transistor 38. This includes a capacitor 56 and a capacitor 58, which connect the collector of transistor 38 to an output terminal 60. This output terminal is the one which is connected to the read-amplifier circuit 28 in FIGURE 3. A resistor 62 is connected between this terminal and ground.

The variable portion of the phase-adjust network is connected between the junction of capacitors 56 and 58 and ground. It includes an inductance 64 and a capacitor 66, both of which have one of their ends connected to the junction of the capacitors 56, 58, and their other ends connected to opposite ends of the resistor of a potentiometer 68. The slide of the potentiometer is connected to ground. It will be appreciated that the circuit described in FIGURE 4 is shown in FIGURE 3 as the clock-phase adjust circuit 22. The potentiometer 68 is operated by the knob 24, shown in FIGURE 3.

Effectively, the circuit shown connected to the collector of transistor 38 comprises a high-pass filter, the delay time of which is controlled by the circuit including the inductance 64, the capacitor 66 and the potentiometer 68. The potentiometer 68 operates to place more resistance in one leg or the other of the parallel circuits provided by the inductance 64 and the capacitor 66, thereby varying its tuning and/or impedance, and thereby varying the phase delay presented by the circuit. With the potentiometer slider substantially in the center position, this will correspond to the zero phase displacement position of the clock pulse. With the potentiometer slider adjusted to insert more resistance in the inductance leg of the circuit, the phase of the clock advances with respect to its reference position, and, when the resistance inserted by the potentiometer 68 increases on the capacitor side of the network, then the phase of the clock is retarded with respect to the reference position. In an embodiment of the invention which was built, the phase-adjust network provided an attenuation of 10 db. To compensate, transistor 38 and its associated circuitry, are connected in class A amplifier fashion, and provide a gain of 10 db, to keep the total circuit gain at one. The amplitude of the output varies less than ten percent for the total range of the potentiometer, and the phase of the signal varies symmetrically about the center position of the potentiometer. The circuit shown will shift the phase of the input signal 130° and can be used for any frequency, as long as the impedance of capacitor 56 is equal to 900 ohms, the impedance of capacitor 66 is equal to 115 ohms, and the inductance of inductor 64 is equal to 115 ohms.

Figure 6:
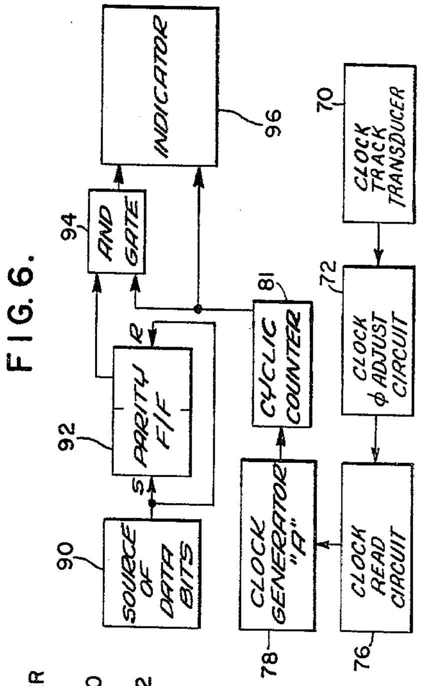
FIGURES 5 and 6 are block diagrams indicating how this invention may be employed for checking the read circuit of a computer.
Figure 5:
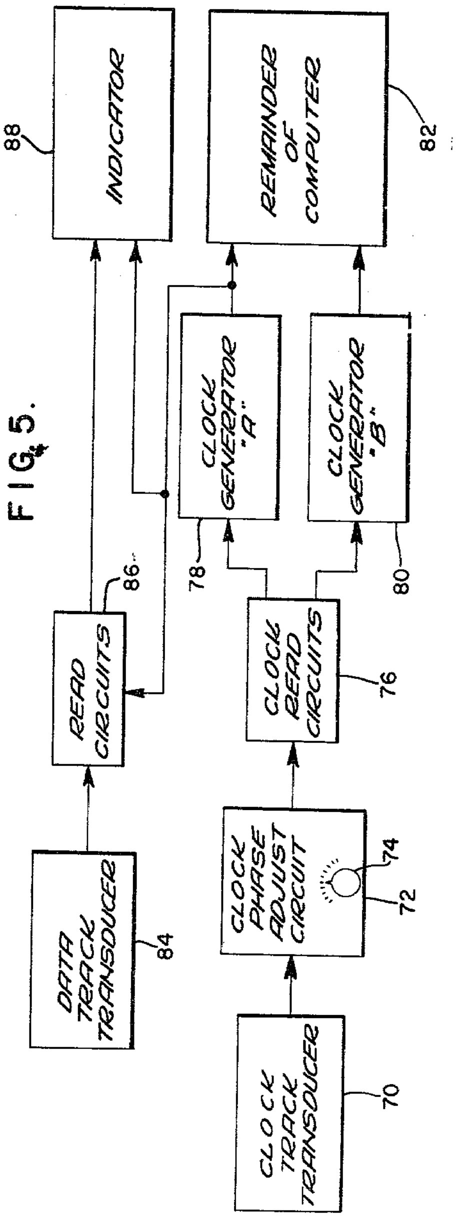

FIGURES 5 and 6 show two arrangements, in accordance with this invention, for utilizing the inventive concept. It should be understood that these two arrangements are shown by way of exemplification and should not be construed as a limitation upon the invention. FIGURE 5 is a block diagram of an arrangement which may be employed for checking the operation of the read portion of a memory upon the occurrence of each one bit which is read from the magnetic drum. A clock-track transducer 70 reads clock pulses which are recorded in a clock track. These are applied to the clock-phase adjust circuit 72, which has a knob 74 for varying the phase of the clock pulses with respect to a reference position. The clock-read circuit 76 then generates two relatively fixed phase-displaced signals from the output of the clock-phase adjust circuit. These signals are applied to a clock-generator-A78 and a clock-generator-B80, which respectively shape these pulses until they have the required width and rectangularity. The outputs of the clock-generator-A and clock-generator-B are applied to the remainder of the computer 82 in the manner normally done.

The output of the data-track transducer 84, which is the transducer normally employed for reading data from any one of the tracks upon a drum, is applied to the read circuits 86. These circuits operate in well-known fashion to generate "one" signals or "zero" signals in response to the data-track transducer output and the output of the clock-generator-A. The digit signals which comprise the output of the read circuits 86 are applied to an indicator 88. Such an indicator may be cathode-ray tube apparatus which visually displays the signals derived from the read circuits, or a counter. Since a magnetic drum is a cyclic device, the signals which have been recorded thereon can be repetitively read and applied to the subsequent indicator 88.

With the knob 74 in the center or reference position, the cathode-ray device will display a pattern corresponding to the bits of data which are read from the magnetic drum. This pattern may be maintained stationary in well-known manner by adjusting the sweep circuits of the cathode-ray tube apparatus. The knob 74 is then turned in one direction, for example, the phase-advance direction, until there is an alteration in the indicated pattern, that is, the "ones" may drop out, or ones may be read where no ones should exist. The position of the knob 74, as indicated by the scale on the clock-phase adjust circuit panel, may then be noted. Thereafter, the knob 74 may be rotated in the direction to cause the phase lag of the clock pulses applied to the read circuits. When the indicator 88 again shows an alteration in the recorded pulse pattern which is displayed, the position of the knob which causes this should also be noted.

From the above procedure, it will be appreciated that any phase shift of the clock pulses less than plus or minus $(\frac{1}{4}D-\frac{1}{2}W)$ microseconds from the center position indicates a beginning deterioration of the read system. The smaller the displacement required for failure of the read system to differentiate between ones and zeros, the more the system has deteriorated. It will be appreciated that this test can be performed very rapidly and simply. No predetermined test pattern recorded on the drum need be employed. Tests of the type indicated may be instituted as a regular maintenance procedure for a computer, and, when the phase shift which deteriorates the ability of the read circuits 86 to distinguish between ones and zeros approaches a predetermined level, the circuits can then be tested intensively and repaired and thus an avoidance of errors is provided for.

The indicator 88 may be a counter. In this event, the count of the counter for a complete cycle of the drum with the clock-phase adjust circuit in the reference position indicates, for example, how many one digits are recorded in a track. The counter can be reset to its initial count condition each time the drum has completed one revolution. A reset pulse can be derived from the drum since, in the usual computer operation using such drums, a start pulse is normally recorded thereon. Alternatively, the number of clock pulses recorded around the periphery of the drum can be counted and the outputs of such a counter can be used for resetting the indicator 88.

The output of the counter just prior to being reset is noted. Thereafter, the clock-phase adjust circuit has the knob 74 operated, first, to advance the phase of the clock-generator-A until the counter 88 fails to count as many one digits in a revolution of the drum as it does for the reference position. This position of the knob 74 is noted. Thereafter, the phase of the clock pulses are retarded until the counter again fails to count as many ones as is known are recorded in a track. The position of the knob 74 is noted again. If the two positions of the knob 74 fall outside of the limits previously determined for accurate operation of the read circuits, the proper corrective procedure can be instituted.

In FIGURE 6 there is shown a block diagram of an arrangement for using the embodiment of the invention with an error-checking system wherein a parity bit is employed. In such a system, the number of binary bits in a code word are counted. In advance it is determined that if the count is, for example, an even one, an extra binary bit will be added, known as the parity bit, so that the count is odd. If the number of bits in a word add up to an odd number, then no parity bit is added. Assume, now, that a recording on the magnetic drum has been made of the data, including the parity bits which are or are not added, as required, for each data word. The rectangle 90, labeled a source of data bits, represents the drum, and associated read circuits, for example 84, 86, which provide as an output the information which is recorded on the drum. These are applied to a flip-flop circuit 92, which is driven from its set to its reset position each time a one bit is applied to its input. Since each word of data must contain an odd number of bits, the parity flip-flop 92 will always be driven to return to the starting stable state; thus the output of the flip-flop 92, when in the "home" stable state, is applied o an AND gate 94. The output of the clock-generator-A 78 is applied to a cyclic counter 81. The cyclic counter 81 is a counter which fills when it has counted the number of clock pulses equivalent to the number of binary bits plus a parity bit in a word. When the cyclic counter 81 fills, it provides an output to the AND gate 94 and to an indicator 96.

Each time a complete word is provided by the source of data bits 90, the parity flip-flop 92 is back at its home position of stability and can provide an output to one of the two inputs of the AND gate 94. At that time, the cyclic counter 81 can provide an output to the AND gate 94 and the indicator 96. The indicator 96 can be of any suitable type which keeps a light lit or an alarm bell quiescent each time it receives the output of the AND gate as well as the cyclic counter 81. However, should it receive only one of these required inputs, then it can cause the light to become illuminated or cause the alarm bell to sound.

The same method of procedure as previously described may be employed. The clock-phase adjust circuit 72 is actuated by means of turning the knob 74, first, in one direction until the indicator 96 becomes energized and the position thereof is noted. The knob 74 is then rotated in the opposite direction until the indicator 96 is energized and the position noted. Should the lag and lead position of the knob 74 be less than a predetermined value, then it is known that the circuit is due for adjustment.

Provision may be made for two clock-phase adjust circuits with subsequent circuitry similar to that shown in FIGURE 5 or FIGURE 6. This is in addition to the normally provided clock-read circuitry. These additional circuits can be set with phase-lead and phase-lag limits. Whenever there is a deterioration inside of these limits an alarm can be actuated.

There has accordingly been shown and described herein a novel, useful, and simple method and means for testing the extent to which the reading circuits of an information-handling machine has deteriorated prior to breakdown, whereby preventive maintenance may be intelligently practiced.

What is claimed is:

1. Apparatus testing for deterioration in a circuit of the type which generates first signals which are combined with clock pulse signals for generating second pulse signals comprising means for advancing the phase of said clock pulse signals relative to a reference position a predetermined amount before combining them with said first signals, means indicating whether second signals are generated as a result of said clock pulse phase advance, means for retarding the phase of said clock pulse signals relative to a reference position a predetermined amount before combining them with said first signals, and means indicating whether second signals are generated as a result of said clock pulse phase retarding.

2. In a data handling machine wherein signals are read from a storage system by a reading circuit and are then combined with clock pulse signals for generating data pulse signals, apparatus for testing said reading circuit comprising:

means indicating as a normal pulse pattern the data pulse signals normally derived from a predetermined region of said storage system;

means for selectively advancing and retarding the phase of said clock pulse signals relative to a reference position a predetermined amount;

means for reading the signals from said predetermined region of said storage system;

means for combining said signals read from said storage system with said advanced and retarded clock pulse signals; and means displaying the resultant of said read signals and said advanced and retarded phase clock pulse signals as a pulse pattern to afford comparison with said normal pulse pattern for differences indicative of a deterioration of said reading circuit.

3. Apparatus for indicating the deterioration in a circuit of the type producing a first pulse signal and requiring the substantial coincidence therewith of a clock pulse signal for producing a third pulse signal, said clock pulse signal being narrower than said first pulse signal, said system comprising means for advancing and retarding the phase of said clock pulse signal relative to a reference position, means for detecting when no third pulse signal is produced by the advance and retardation of the phase of said clock pulse signal, and means for indicating the extent of said phase advance and retardation at which no third pulse signal is produced to thereby indicate the extent of deterioration of said circuit which produces said first pulse signal.

4. In a data handling machine of the type having a circuit for reading stored signals and for generating pulse signals by comparing the signals read with clock pulse signals, apparatus for indicating the extent of the deterioration of said reading circuit for reading stored signals comprising a phase shift network, means for applying clock pulse signals to said phase shift network, means for combining said phase shift network output and the output of said circuit for reading stored signals, means for actuating said phase shift network to advance the phase of said clock pulse signals a predetermined amount relative to a reference position and to retard the phase of said clock pulse signals a predetermined amount relative to said reference position, and means for indicating whether there is a failure to generate pulse signals as a result of the actuation of said phase shift network to thereby indicate a deterioration in said reading circuit.

5. In a data handling machine as recited in claim 4 wherein said phase shift network includes a first capacitor, a second capacitor connected in series with said first capacitor, a network connected to the connection between said first and second capacitors, said network including a capacitive reactance, an inductive reactance and a potentiometer, means connecting one end of said potentiometer to one end of said capacitive reactance, means connecting the other end of said potentiometer to one end of said inductive reactance, means connecting the other ends of said inductive and capacitive reactances together and to the connection between said capacitors, means for applying said clock pulse signals to said first capacitor, and means for deriving phase shifted clock pulse signals from said second capacitor.

6. In a data handling machine of the type wherein each word is represented by a predetermined number of binary signals and a parity signal is added as required, and wherein said words and signals are read from a storage system in which they may be stored by a reading circuit and are then combined with clock pulse signals for regenerating the word and parity bit signals, means for detecting deterioration in said reading circuit comprising a bistable state flip-flop circuit, means for applying each said regenerated word and parity signal to said flip-flop circuit to drive it from one to the other of its states of stability in response to each "one" representative signal contained therein, a phase-shift circuit, means for applying said clock pulse signals to said phase-shift circuit prior to being combined with the signals read from said storage system, means for actuating said phase-shift circuit for advancing the phase of said clock pulses relative to a reference position a predetermined amount and for retarding the phase of said clock pulses relative to a reference position a predetermined amount, a cyclic counter having a capacity equal to the number of binary signals in a word plus a parity signal, means for applying clock pulses to said counter for causing it to be driven, means to derive an output from said counter when it attains its last count state, gate means to which both said counter output and the output of said flip-flop when in one of its bistable states is applied to provide an output in the simultaneous presence of both inputs, and an indicator to which the output of said gate means and said counter is applied to be actuated when it receives only one of its two outputs providing an indication that the reading circuit is deteriorating.

References Cited by the Examiner

UNITED STATES PATENTS

| | | | |
|---|---|---|---|
| 2,413,396 | 12/46 | Weagant | 179—15 |
| 2,619,547 | 11/52 | Ross | 179—15 |

MALCOLM A. MORRISON, *Primary Examiner.*

IRVING L. SRAGOW, *Examiner.*